UNITED STATES PATENT OFFICE.

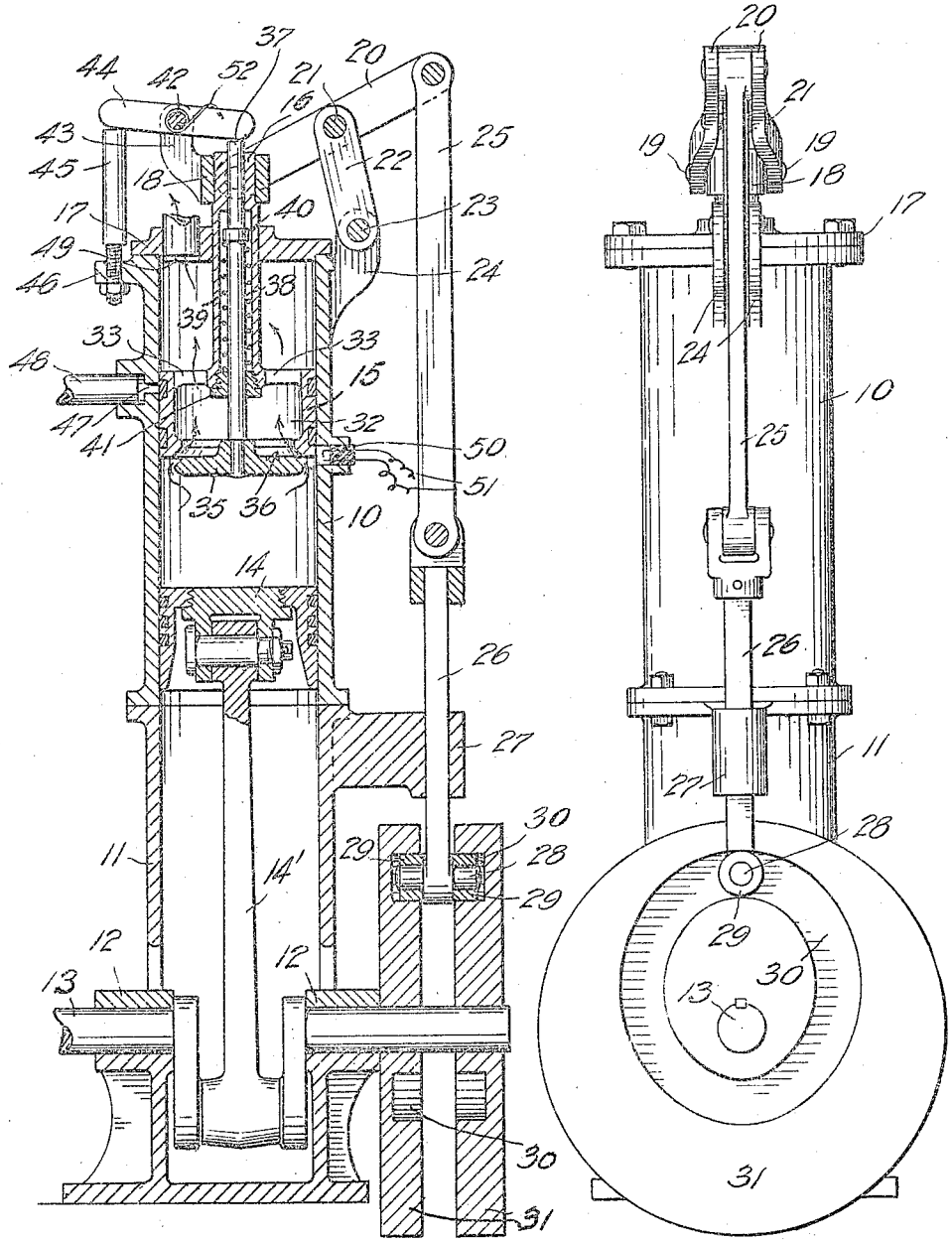

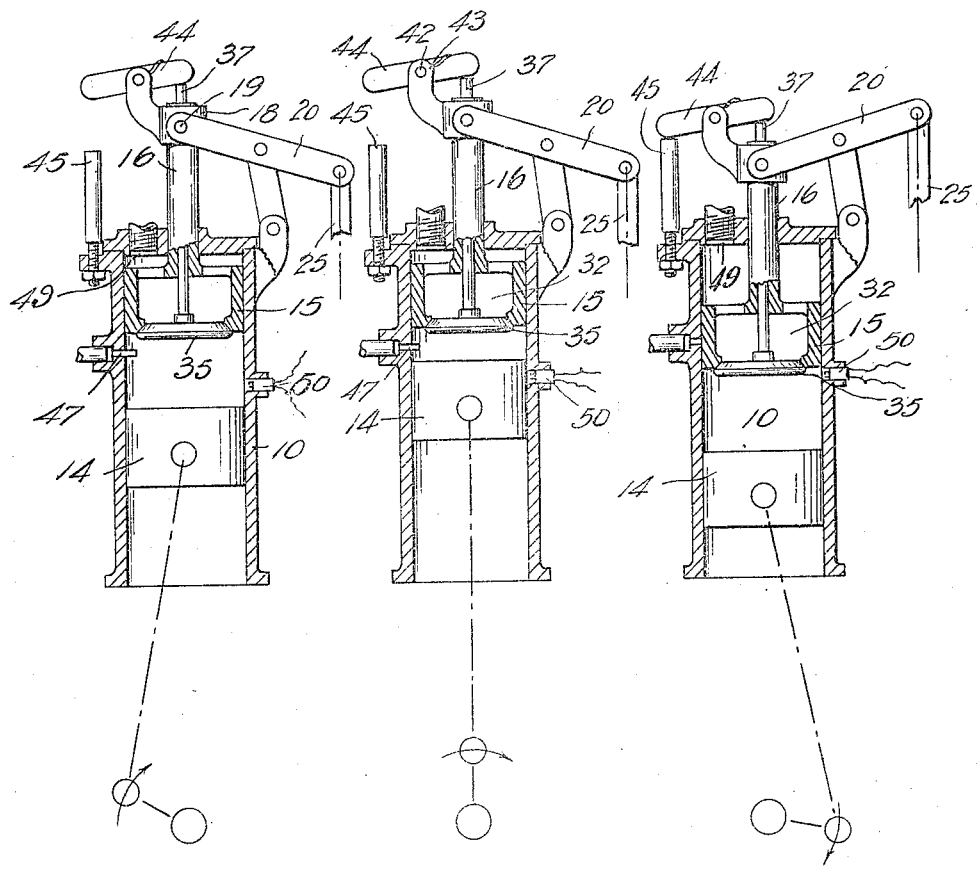

JOHN W. BRADLEY, OF SEATTLE, WASHINGTON, ASSIGNOR OF ONE-HALF TO JACOB E. EICKEICK, OF SEATTLE, WASHINGTON.

INTERNAL-COMBUSTION ENGINE.

961,677.	Specification of Letters Patent.	Patented June 14, 1910.

Application filed June 21, 1909. Serial No. 503,548.

*To all whom it may concern:*

Be it known that I, JOHN W. BRADLEY, a citizen of the United States, residing at Seattle, in the county of King and State of Washington, have invented certain new and useful Improvements in Internal-Combustion Engines, of which the following is a specification.

This invention relates to internal combustion engines; and its object is to improve the efficiency of the same.

The invention consists in the novel construction, adaptation and combination of parts, as will be hereinafter described and claimed.

In the drawings, forming a part of this specification, Figure 1 is a vertical longitudinal cross sectional view of an engine embodying my invention. Fig. 2 is an elevation of the right hand end of the engine as shown in Fig. 1 with one of the cam-wheels omitted. Figs. 3, 4 and 5 are diagrammatic views showing the relative positions of the piston and the follower at three different points during one revolution.

The reference numeral 10 designates the engine cylinder which is rigidly secured to a suitable base 11 wherein are provided bearings 12 for a crank shaft 13. Fitted within the cylinder is a piston 14 which is connected by a rod 14' with the crank-pin of said shaft. A second piston, or follower, 15 is also fitted within the cylinder and has a piston rod 16 extending through an axially disposed opening in the cylinder head 17. Rigidly secured to the outer end of the piston rod is a ring 18 which is provided upon diametrically opposite sides with trunnions 19 for connection with lever elements 20 which are fulcrumed to a pin 21 carried by a support 22. The latter is connected for oscillation by a pin 23 with lugs 24 provided upon the cylinder. The ends of the lever elements 20 which are opposite to their connections with said trunnions are connected by a link 25 with a rod 26 passing through a guide 27 which is rigid with the engine base. Provided for the rod 26 is a pin 28 having upon its protruding ends rollers 29 engaging in cam-ways 30 formed in balance wheels 31 which are splined or otherwise rigidly secured to the shaft.

The follower 15, as illustrated, is chambered to afford a by-pass 32 therein which communicates with the cylinder chamber from above by apertures 33 and from below through an opening which is normally shut by a valve 35 closing against an underneath seating face 36. Said valve is provided with a stem 37 which extends axially through the piston-rod 16 to a distance beyond the outer end of the same. The bore of the rod 16 through which said stem extends is enlarged, as at 38, Fig. 1, to accommodate a spring 39 which acts between a collar 40 upon the stem and a removable bushing 41 inserted in the mouth of the bore. The spring as thus arranged tends to maintain the valve in closed condition on its seat 36. Pivotally secured by a pin 42 to ears 43 provided upon the ring 18 is a lever 44 having one of its arms extend over the top of the valve-stem 37 while its other arm is disposed to be in position to encounter in its successive downward movements a stud 45 which is adjustably secured to the cylinder lug 46.

In the peripheral wall of the cylinder is a port 47 for the admission of the combustible gases and is positioned at a height to be in a plane intermediate the piston 13 and the follower 15 when they have completed their upward strokes, as represented in Fig. 4. This port is connected by a pipe 48 with a gas supply and, in practice, would desirably have included in its length an automatic non-return valve, not shown in the drawings, which may be of the ordinary type of "check-valves." At the top of the cylinder, as in the cylinder-head for example, is an opening 49 for the discharge of the spent gases.

50 represents a sparking-plug which is disposed to be somewhat below the level of said intake port 47 so that the latter may be masked by the follower 15 prior to the ignition of the gases. The sparking-plug is connected by electric connecting wires 51 with a suitable energizer, not shown, which is actuated in proper sequence through mechanism operated from the engine shaft.

52 is a spring for yieldingly holding the end of lever 44 against the top of the valve stem 37.

The operation of the invention is as follows: Assuming that a compressed charge of previously admitted explosive gases is present between the piston 14 and the follower 15 when in the position whereat they are represented in Fig. 4. The piston and the follower then descend through the momentum derived from the preceding explosion and principally conserved in the cam-wheels 31 and is transmitted to such members through the agency of the shaft-crank and the rollers 29 being actuated in the cam-ways 30. By the piston and the follower thus accompanying each other the pressure of the charge therebetween is maintained until, at least, the crank has passed well over the dead center. Whereupon the ignition of the charge is effected through the timed sparking devices to impart power through the piston to the shaft. Through the cam-wheels and connecting mechanism (rods 26, 25 and lever 20) the follower is coincidently caused to proceed in its downward travel in opposition to the force of the explosion, but at a less speed than that at which the piston is traveling. This difference in the speeds of the piston and follower allows for the expansion of the exploded charge and thereby furnishes the effective power to the engine. When the piston and follower are respectively in proximity to the ends of such downward strokes, see Fig. 5, the lever 44 strikes the stud 45 causing the lever 44 being tilted by the stud to overcome the power of the spring 39 and thereby open the valve 35, as indicated in Fig. 1. A still further downward movement of the follower together with the unbalanced pressures prevailing above and below the follower causes the previously exploded gases to flow through the follower and thence escape by the discharge opening 49. The follower, through the offices of the cams 31, now ascends, the valve 35 remaining open until the lever 44 has been elevated from the stud 45 to allow the spring 39 to assert its power to close the valve. The follower continuing to ascend creates a partial vacuum therebelow which induces an intake of a charge of the explosive-gases through the port 47 between the follower and the pursuing piston. The latter begins its upstroke subsequent to the starting of the follower which arrives at the termination of its stroke when the piston is about in the position whereat it is indicated in Fig. 3. The piston continuing in its upward travel effects the compression of the charge and thus completes a cycle of operation in a single rotation of the shaft.

While I have illustrated and described a single cylinder engine, two or more cylinders may obviously be employed instead.

Among the functions presented by this invention may be mentioned the creation of an effective maximum compression of the explosive gases being maintained after the crank-shaft has traversed the dead-center and which may be varied by the adjustment of the cam controlling the follower. Said cam device allows of regulation to effect the desired compression at a predetermined point.

What I claim is—

1. In a gas engine, a piston, a follower having movement independent of the piston, a by-pass extending through said follower, a spring-closed valve for said by-pass, means operative from the engine shaft for reciprocating the follower, and means operative subsequent to the initial movement of the follower toward said piston for opening said valve for the escape of the spent gases through said by-pass.

2. In a gas engine, the combination of the piston, the follower, means actuated by an explosion intermediate the piston and follower causing the follower to accompany the piston, a by-pass in the follower, a valve for the by-pass, and means operative by the motions of said follower for opening the valve for the escape of spent gases therethrough during the later portions of the downward stroke and the early portions of the upward stroke of the follower, and a spring for restoring said valve to its closed position during the remaining portions of the follower stroke.

3. In a gas engine, the combination of a cylinder, a piston, a crank-shaft, a connecting rod, a follower, connections between said shaft and the follower whereby the latter is given corresponding motions with the piston at different speed, an inlet port for the admission of the explosive charge between the piston and the follower, an exhaust opening in the end of the cylinder, a passage-way through the follower, a valve for said passageway, and automatic means for opening said valve subsequent to the explosion of said charge.

4. In a gas engine, the combination with the cylinder provided intermediate of its length with an inlet port and an exhaust port at an end of the cylinder, of a piston, a follower, a by-pass in the follower, a valve in said by-pass, connections between the piston and the follower adapted to cause their traveling at different speeds so as to effect during one stroke of the piston the expulsion of spent gases, the intake of an explosive charge and the compression of the same, and in the following stroke the maintenance of the compression during the early part of the stroke, and the opening of said by-pass valve during the latter portion of the stroke and subsequent to the explosion of said charge.

5. In a gas engine, the combination of the cylinder provided with an inlet port intermediate its length and an exhaust port at one end, a crank-shaft, a piston, a connecting rod between the piston and said shaft, a follower having a by-pass therethrough, a piston-rod for the follower and extending through the cylinder end, a valve for said by-pass, a stem for the valve and extending through said piston rod, means operated from said shaft and connected with said piston rod for actuating the follower, and means engageable with said stem for retaining said valve open when said follower is in proximity to the lower end of its strokes.

6. In a gas engine, the combination of the cylinder provided with an inlet port intermediate its length and an exhaust port at one end, a crank-shaft, a piston, a connecting rod between the piston and said shaft, a follower having a by-pass therethrough, a piston rod for the follower and extending through the cylinder end, a cam upon said shaft, operative connections between said cam and the piston rod, a valve for the by-pass at the end of the follower adjacent to said piston, a stem for the valve and extending through said piston-rod, a spring acting to maintain said valve in closed condition, and means engageable with said stem for retaining said valve open when said follower is in proximity to the lower end of its strokes.

7. In a gas engine, the combination of the cylinder provided with an inlet port intermediate its length and an exhaust port at one end, a crank-shaft, a piston, a connecting rod between the piston and the said shaft, a follower having a by-pass therethrough, a piston-rod for the follower and extending through the cylinder end, means operated from said shaft and connected with said piston rod for actuating the follower, a valve for the by-pass, a stem for the valve and extending through said piston rod, a spring acting to maintain said valve in closed condition, a lever carried by said piston-rod, and means engageable by said lever during the downward strokes of the follower for effecting the opening of said valve.

8. In a gas engine, a piston, a follower having a by-pass therein, a valve for said by-pass, means for actuating said follower to cause the same to accompany the piston in the downward stroke of the latter, means actuated by the movement of the follower and subsequent to the commencement of its downward stroke for opening said valve, and means for restoring said valve to its closed condition during the upward stroke of the follower.

9. In a gas engine, the combination with a cylinder having an inlet and an outlet, a piston within the cylinder, a follower within the cylinder and having a by-pass extending therethrough, a rod on the follower extended through the end of the cylinder, a valve for said by-pass, a spring tending to maintain said valve in closed condition, means connected with said rod for reciprocating the follower, means inoperative during the early downward movement of the follower for opening said valve to exhaust the spent gases during the final portion of the downward and the early portion of the upward strokes of the follower.

JOHN W. BRADLEY.

Witnesses:
PIERRE BARNES,
J. E. ZICKRICK.